(12) United States Patent
Frieder et al.

(10) Patent No.: US 7,860,876 B2
(45) Date of Patent: Dec. 28, 2010

(54) PEER-TO-PEER FILE SHARING

(75) Inventors: Ophir Frieder, Chicago, IL (US); Wai Gen Yee, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 136 days.

(21) Appl. No.: 11/450,776

(22) Filed: Jun. 9, 2006

(65) Prior Publication Data
US 2007/0288446 A1    Dec. 13, 2007

(51) Int. Cl.
G06F 7/00 (2006.01)
G06F 17/30 (2006.01)

(52) U.S. Cl. ...................................... 707/759; 707/967
(58) Field of Classification Search ........................ None
See application file for complete search history.

(56) References Cited

U.S. PATENT DOCUMENTS

| | | | | |
|---|---|---|---|---|
| 5,920,854 | A * | 7/1999 | Kirsch et al. | 707/3 |
| 6,363,374 | B1 * | 3/2002 | Corston-Oliver et al. | 707/3 |
| 2002/0178152 | A1 * | 11/2002 | Azzam | 707/3 |
| 2003/0041054 | A1 * | 2/2003 | Mao et al. | 707/3 |
| 2004/0044793 | A1 * | 3/2004 | Pauly et al. | 709/246 |
| 2006/0168304 | A1 * | 7/2006 | Bauer et al. | 709/232 |
| 2006/0212817 | A1 * | 9/2006 | Paek et al. | 715/745 |
| 2006/0224571 | A1 * | 10/2006 | Leon et al. | 707/3 |
| 2007/0081197 | A1 * | 4/2007 | Omoigui | 358/403 |
| 2007/0143278 | A1 * | 6/2007 | Srivastava et al. | 707/5 |

OTHER PUBLICATIONS

Loo, B. T. et al. "Enhancing P2P File-Sharing with an Internet-Scale Query Processor", Proceedings of the 30th VLDB conference, Toronto Canada, Aug. 31-Sep. 3, 2004. http://www.vldb.org/conf/2004/RS11P2.PDF*
W. Meng et al.: *Building Efficient and Effective Metasearch Engines*, ACM Computing Surveys, vol. 34, No. 1, Mar. 2002, pp. 48-89.
P. Reynolds et al.: *Efficient Peer-to-Peer Keyword Searching*, Dept. of Computer Science, Duke University, ACM Conf., Middleware, 2003.

(Continued)

*Primary Examiner*—Luke S. Wassum
*Assistant Examiner*—Nicholas E Allen
(74) *Attorney, Agent, or Firm*—Pauley Petersen & Erickson

(57) ABSTRACT

A peer-to-peer (P2P) file sharing system is provided with an enhanced search method for a client computer therein. The method includes masking at least one term in a multi-term query entered into a client computer of the P2P system to obtain a masked query and routing the masked query to a plurality of server computers. The masked query is compared to a file descriptor of server files in each of the plurality of server computers to identify a plurality of matching server files. The server computers return to the client computer as search results the file descriptor and a mathematical identifier for each of the plurality of matching server files. The server computer may return to the client computer only a subset of the plurality of the matching server files. Enhanced P2P file searching accuracy is provided.

20 Claims, 1 Drawing Sheet

Files
Replica R1, of File $F_1$: descriptor = {A, B, C | $K_{F1}$}.
Replica R2, of File $F_2$: descriptor = {A, C | $K_{F2}$}
Replica R3, of File $F_1$: descriptor = {A, B | $K_{F1}$}
Replica R4, of File $F_1$: descriptor = {D | $K_{F1}$}
Replica R5, of File $F_2$: descriptor = {F | $K_{F2}$}
Replica R6, of File $F_2$: descriptor = {F, G | $K_{F2}$}
Replica R7, of File $F_2$: descriptor = {H, I | $K_{F2}$}

Query invocation

Query $Q_{M[X...Y]}$ = Query Q with terms X ... Y masked

Query Q = {A, B, C, C, D} returns no results
Query $Q_{M[D]}$ = {A, B, C, C} returns a result for R1
Query $Q_{M[A,B,D]}$ = {C, C} returns results for R1, R2
Query $Q_{M[A,C,D]}$ = {B} returns results for R1, R3
Query $Q_{M[B,C,D]}$ = {A} returns results for R1, R2, R3

Group by key $K_{Fi}$
Query $Q_{M[B,C,D]}$ = {A}
  Group $G_1$: R2
  Group $G_2$: R1 & R3

Ranking (by Group Size)
  1. Group $G_2$
  2. Group $G_1$

OTHER PUBLICATIONS

C. Rohrs: Technical Report: *Keyword Matching*, Limewire, Dec. 2000.
C. Rohrs: Technical Report: *Search Result Grouping*, Limewire, Aug. 2001.
S. Saroiu et al.: *A Measurement Study of Peer-to Peer File Sharing Systems*, Dept. of Computer Science and Engineering, Univ. of Washington, Seattle, WA (2002).
C. Tang et al.: *Peer-to-Peer Information Retrieval Using Self-Organizing Semantic Overlay Networks, SIGCOMM'03*, Aug. 2003, Karlsruhe, Germany.
J. Lu et al.: *User Modeling for Full-Text Federated Search in Peer-to-Peer Networks*, Language Technologies Institute, Carnegie Mellon University, ACM SIGIR, 2006, Seattle, Washington.
Copending U.S. Appl. No. 11/450,739, filed Jun. 9, 2006.

\* cited by examiner

Files
Replica R1, of File F$_1$; descriptor = {A, B, C | K$_{F1}$}.
Replica R2, of File F$_2$; descriptor = {A, C | K$_{F2}$}
Replica R3, of File F$_1$; descriptor = {A, B | K$_{F1}$}
Replica R4, of File F$_1$; descriptor = {D | K$_{F1}$}
Replica R5, of File F$_2$; descriptor = {F | K$_{F2}$}
Replica R6, of File F$_2$; descriptor = {F, G | K$_{F2}$}
Replica R7, of File F$_2$; descriptor = {H, I | K$_{F2}$}

Query invocation

Query Q$_{M[X ... Y]}$ = Query Q with terms X ... Y masked

Query Q = {A, B, C, C, D}  returns no results
Query Q$_{M[D]}$ = {A, B, C, C}  returns a result for R1
Query Q$_{M[A,B,D]}$ = {C, C}  returns results for R1, R2
Query Q$_{M[A,C,D]}$ = {B}  returns results for R1, R3
Query Q$_{M[B,C,D]}$ = {A}  returns results for R1, R2, R3

Group by key K$_{Fi}$
Query Q$_{M[B,C,D]}$ = {A}
    Group G$_1$:  R2
    Group G$_2$:  R1 & R3

Ranking (by Group Size)
    1. Group G$_2$
    2. Group G$_1$

FIG. 1

PEER-TO-PEER FILE SHARING

BACKGROUND OF THE INVENTION

Peer-to-peer (P2P) file sharing is a major peer-to-peer application, with millions of users sharing millions of files and consuming a large proportion of Internet bandwidth. In such a large-scale system, it is important to supply accurate, but yet, efficient search capabilities, lest the user be overwhelmed with search results. However, the search capabilities of these systems are generally weak, particularly in ranking query results.

In a pure peer-to-peer system, true clients and servers do not really exist because each node, i.e., computer, functions simultaneously as both a server and a client. However, as an aide to understanding the present invention, and not by way of limitation, the following terminology as may be used herein is explained. A client is a machine running a software routine seeking and receiving information. A server is a machine in the P2P file sharing system acting as a data repository and provider. A content file is a data object that is a unique set of data, e.g., song, picture, or any other thing in digital format. A replica is a copy of a content file. A node is one or more machines acting as one location in the network. A node will simply be referred to as a computer herein, and is meant to encompass all automated data handling apparatuses.

Standard file sharing models include the common P2P file sharing systems Gnutella and Kazaa. These systems make very few assumptions about the behavior of users and about the data they share. Peers of a P2P file sharing system collectively share a set of content files by maintaining local replicas of them. Each replica of a content file (e.g., a music file) is identified by a descriptor. A descriptor is a metadata set, which comprises terms (i.e., a "bag of words") and is typically implemented as a filename. Depending on the implementation, a term may be a single word or a phrase. P2P searching consists of identifying content files through a search of the descriptors of the individual content files.

A peer acts as a client by initiating a particular query for a content file. A query is also a metadata set, composed of terms that a user thinks best describe the desired content file. A query is generally routed to all reachable peers, which act as servers.

P2P file sharing systems generally have simple keyword-based data retrieval functions. In general, queries are conjunctive, so servers return references to file replica whose descriptors contain all of the unique query terms. This containment condition is often referred to as the matching criterion. Each reference, which is generally referred to herein as a "result" or a "search result," contains the replica's descriptor and the identity of the server that returned it. The descriptor within the result helps the user and client distinguish the relevance of the content file to the query, and the server identity is required to initiate the content file's download.

Once the user selects a search result, a local replica of the corresponding content file is made by downloading it from the corresponding server. In addition, the user has the option of manipulating the local replica's descriptor in his own computer. He may manipulate it for personal identification or to better share it in the P2P file sharing system.

Traditional Information Retrieval (IR) techniques used to improve result ranking are generally inapplicable in the P2P environment. Such techniques generally assume fixed architectures where dedicated servers manage statistics on the shared data and use them to generate a ranked list of results to return to the client. Such servers, however, do not exist in pure P2P environments; and even if they did, the set of shared data are constantly in flux due to the high churn rates (e.g., rate of joining and leaving the network) of participating peers. Reliable statistics are therefore hard to maintain.

Furthermore, servers in a P2P system independently maintain data and respond to queries. Each replica is annotated independently with metadata and may be particular to the user's tastes. For example, one user might annotate a particular Madonna song as "pop music," whereas another may annotate it as "80's music." Searches for this content file are complicated due to variations in the way it is identified.

Servers are also free to return whatever results they please in response to an incoming query. For example, a malicious server may send irrelevant marketing material or viruses in its responses. The client must aggregate the results from the disparate sources and try to rank them correctly.

In effect, P2P query processing is distinct from that of traditional search engines in that P2P query processing is a two-step process. The independent servers first generate responses to a query and then the clients must make sense of the responsive results. In contrast, in traditional IR systems, all data are centralized at a single site allowing a comprehensive search. This allows the creation of an integrated result set based on the global data set. Centralized servers can also perform optimizations, such as ranking results based on previous user selections.

Much of today's work in P2P searching focuses on identifying highly reliable peers and giving them specialized roles in statistics maintenance, indexing, and routing. Much of the known P2P improvement work proposes a focus on the architecture of P2P file sharing systems to improve searching by identifying highly reliable peers, and giving them specialized roles in statistics maintenance, indexing, and routing. The performance of such systems can be impressive; however, the application domain is different than the one presently considered. The present invention makes no assumptions about the relative capabilities of the peers, and so is likewise applicable to ad hoc environments, where functionality is fully distributed among all participants.

SUMMARY OF THE INVENTION

Known P2P file sharing search accuracy is poor; thus, there exists a need for its improvement. The method of the present invention has been found experimentally to increase search accuracy by up to 40% over known P2P searching approaches. An embodiment of the present invention also provides a lower degree improved search accuracy with decreased cost as compared to not employing the invention.

It is noted that within other fields of traditional information management, such as Information Retrieval (IR), discussed above, and Database Management Systems (DBMS), various schemes are used for refining searches. However, the techniques known in these fields are not considered analogous, applicable and/or transferable to the field of known P2P file sharing systems. In DBMS, query results are, by definition, completely accurate. That is, all correct answers are returned, namely 100% recall, and all returned answers are correct, namely 100% precision. In DBMS searching, any query refinement is defined in terms of query optimization for timing performance, not accuracy of results. Thus, DBMS querying is unrelated to the present invention.

The general object of the invention can be attained, at least in part, through a method for implementing a search in a peer-to-peer (P2P) file sharing system. The method includes masking (i.e., removing) at least one term in a query (i.e., a multi-term query) entered into a client computer of the P2P system to obtain a masked query, searching a plurality of server computers of the P2P system using the masked query, and returning search results to the client computer. The search results are presented to the user in a human perceivable form through the client computer.

The invention further comprehends a method for implementing a search in a peer-to-peer (P2P) file sharing system. The method includes masking at least one term in a query entered into a client computer of the P2P system to obtain a masked query. The masked query is routed to a plurality of server computers and compared to a file descriptor of at least one, and desirably each, server file in each of the plurality of server computers, to identify a plurality of matching server files. The server computers return to the client computer as search results the file descriptor and a mathematical identifier for each of the plurality of matching server files. The client computer groups each of the search results into one of a plurality of groups as a function of the mathematical identifier, and ranks the plurality of groups.

The invention still further comprehends an improvement in a method for implementing a search in a network system including routing a query inputted into a client computer to a server computer, identifying a plurality of matching server files, and returning server file information to the client computer as search results. The improvement includes the server computer returning to the client computer the server file information, e.g., results corresponding to, only a subset of the plurality of the matching server files. Each server file of the subset is selected according to a given probability and/or the subset includes up to a predetermined number of the matching server files.

The invention still further comprehends a method for implementing a search in a peer-to-peer (P2P) file sharing system. The method includes masking at least one term in a query entered into a client computer of the P2P system to obtain a masked query and routing the masked query to a server computer. The server computer compares the masked query to a file descriptor of a server file in the server computer to identify a plurality of matching server files. The server computer selects a subset of the plurality of the matching server files. Each server file of the subset is selected according to a given probability and/or the subset includes up to a predetermined number of the matching server files. The server computer returns to the client computer as search results the file descriptor and a mathematical identifier for the server files of the subset of the plurality of matching server files.

It is contemplated by the present invention that processes for selective peer-to-peer communication may be instituted in the present system. Security systems may be instituted to allow either of the client computers or server computers to judge the desirability of sharing files with particular nodes or classes of nodes. Such judgments may be based on any number of criteria, including the trustworthiness of the node, the quality of the node, the location or activity history of the node, etc. It is further contemplated that a fee system may be instituted in the present system for charging and/or payment of content fees. For example, some nodes may be identified as a dominant market source, or otherwise offer preferential content or services for certain types of files, which would justify payment. For example, a server may be identified as a preferential source due to its upload speed, or the quality of its bitstreams for song files, or the like, and thus merit payment of fee to utilize that server node. The creation of custom applications, or the adaptation of known applications, for accomplishing such purposes, and their implementation, is considered to be within the skill of the art.

References herein to "metadata" are to be understood to refer to data describing data. For example, the metadata of a content file (the "data") can include a file descriptor, a mathematical identifier, and a server identifier (identifying the location of the content file).

References herein to a "file descriptor" or "descriptor" are to be understood to refer to human readable terms associated with, e.g., naming, a content file.

References herein to a "mathematical identifier" are to be understood to refer to any computation on the file bit-stream or selected portion of the bit-stream used to determine identity, preferably, but not always unique identity. A hash value or hash key computed by application of a hash function on a file is an example of a mathematical identifier.

References herein to a "replica" are to be understood to refer to a copy of a content file. A unique mathematical identifier is associated with each unique content file, and all replicas of that content file have the same mathematical identifier.

References herein to a "server file" are to be understood to refer to a content file on a server computer. Server files are typically, but not necessarily, replicas.

BRIEF DESCRIPTION OF THE DRAWINGS

FIG. 1 illustrates a search using techniques according to the present invention.

DETAILED DESCRIPTION OF THE EMBODIMENTS

FIG. 1 illustrates an exemplary P2P search according to one embodiment of this invention. There are two different content files, $F_1$ and $F_2$, which are contained among seven server files, replicas R1-R7. The metadata of each of the replicas R1-R7 includes a file descriptor, containing at least one term, represented by the uppercase letters, and a unique mathematical identifier in the form of a hash key, designated by $K_{Fi}$ for content file $F_i$. The replicas R1, R3 and R4 contain content file $F_1$. The replicas R2 and R5-R7 contain content file $F_2$. Each replica R1-R7 has a different file descriptor, as given by the peer or user of the corresponding server computer. However, there are only two different hash keys, one for each unique content file. The content file desired by the user may, for example, be a song file. The file descriptors of the replicas R1-R7 may be a song title, a band name, an album name, an abbreviated song title, etc., as devised by each peer and stored in the peer machine, i.e., a "server computer" in the present P2P description. The content file mathematical identifiers, $K_{F1}$ and $K_{F2}$, in the metadata, however, are derived from a hashing function, such as standard hash functions which are currently available, performed by computer on the bit-stream of the file data, and thus will be the same for each same content file.

Information retrieval or searching in the P2P system begins by a user entering a search query into a client computer. In FIG. 1, the query entered into the client computer is {A, B, C, C, D}. As shown in FIG. 1, if the search is performed according to known P2P search procedures by routing the conjunctive query to the server computers having R1-R7, no results are returned. No results are returned because none of the file descriptors includes each unique term (A, B, C, and D) of the query.

The remaining four queries shown in FIG. 1 are designed according to a method for implementing a search in a P2P file sharing system of one embodiment of this invention. The client computer selects one or more unique terms of a query entered into a client computer for masking by removing all instances of the selected term(s) of the query, to obtain a masked query, designated $Q_M$ in FIG. 1. If the client computer does not mask all instances of the selected term(s), then the term(s) would still be present in the masked query, and the search results would not change. Desirably, the terms masked are not simply conjunctions, e.g., "and" and "or", or other common terms, although such words can be masked, if desired, if included in the query. The masked query, such as $Q_{M[D]}$ or $\{A, B, C, C\}$, is then routed to the server computers.

The server computers desirably include software, such as that which is included in or bundled with the P2P protocol software that receives the masked query and performs the search within the corresponding server computer. The search of each of the server computers is performed by matching the terms of the masked query to terms of one or more file descriptors in the server computer. The server computer compares the masked query to the file descriptors of the server files, e.g., replicas R1-R7, to identify one or more matching server files. In one embodiment of this invention, the file descriptor matches the masked query when the file descriptor contains all unique terms of the masked query, i.e., the masked query is a conjunctive query.

Referring to masked query $Q_{M[D]}$ in FIG. 1, R1 is the only matching server file that contains each of the remaining unique terms $\{A, B, C\}$ of the masked query. At least the file descriptor and the unique mathematical indicator for the file $\{A, B, C | K_{F1}\}$ are desirably returned to the client computer as a search result. Other information, such as a server computer identifier, can also be desirably returned to the client computer. As shown in FIG. 1, varying the number and/or the choice of term(s) masked from the query provides different search results. $Q_{M[A,B,D]}$ or $\{C, C\}$ returns replicas R1 and R2; $Q_{M[A,C,D]}$ or $\{B\}$ returns replicas R1 and R3; and $Q_{M[B,C,D]}$ or $\{A\}$ returns replicas R1, R2, and R3. As demonstrated in FIG. 1, masking according to this invention desirably generally increases the size of the result set, as compared to not masking, which, in this example, returns no results, and thereby generally increases the likelihood of obtaining the desired result(s). Overall, the client computer is provided with additional information that can be used to improve the quality of the results provided to the user.

The client computer desirably automatically masks an entered query by removing one or more terms from the query. In one embodiment of this invention, the client computer randomly selects which query term(s) to mask. The query term(s) to be masked can, alternatively, be a term that appears either most or least frequently in one of either the entered query or local descriptors on the client computer. The client computer may mask the least frequent terms, as most frequent terms can emphasize what the user desires. The client computer may mask the most frequent terms, as less frequent terms can emphasize distinctiveness. In one embodiment of this invention, terms are masked based upon their frequency within the query. When two or more terms that are candidates for masking appear at the same frequency in the entered query, the client computer can mask the term(s) that appear the most or least frequently in the local descriptors in the client computer. Terms appearing more frequently in the local descriptors can indicate less selective terms, while terms appearing less frequently can indicate terms that are overly precise. Combinations of these masking techniques are also available, such as, for example, randomly selecting the term(s) from the terms that appear most or least frequently in the query and/or local descriptors.

Upon receiving the file descriptor and the mathematical identifier for each of the matching server files being returned to the client computer as search results, the client desirably divides the search results into groups. In one embodiment of this invention, each of the search results is grouped into one of a plurality of groups as a function of the mathematical identifier. Server files having the same mathematical identifier (e.g., hash key), are grouped together, and in a different group from server files having a different mathematical identifier, regardless or independent of the terms in the file descriptor. Referring to the embodiment of FIG. 1, the masked query $Q_{M[B,C,D]}$ returns as search results replicas R1, R2, and R3. Replica R2 is a replica of File $F_2$, and is grouped into group $G_1$. Replicas R1 and R3 are identified as replicas of the same file, $F_1$, as both replicas R1 and R3 have the same mathematical identifier (hash key) and are grouped together in group $G_2$.

The client computer desirably updates ranking scores of the search results as search results arrive at the client. The ranking can be done according to a ranking metric, such as, for example, group size, term frequency, term precision, or cosine similarity. In the embodiment illustrated in FIG. 1, the groups $G_1$ and $G_2$ are ranked according to group size; with group $G_2$ ranked first as it contains two results, versus $G_1$, which contains one result. Ranking according to group size, or other non-content based metrics, can be particularly useful when queries are short or the masking degree is low. Group size also typically works well because most queries are for popular content files and such queries are likely to return the most results, as they are highly replicated in the system.

When the percentage of query terms that are masked is high, term frequency can be the preferred ranking metric. When the percentage of query terms that are masked is low, group size can be the preferred ranking metric. When the percentage is high, cosine similarity typically does not work as well because of the skewed metadata of the result set and group size typically does not work as well because there is so much noise in the result set. Given a single term, a large group may represent several unique content files, obscuring the group size rankings. Because term frequency also counts the contents of the descriptor, it can escape this problem. Term precision does well for a similar reason. Group size is generally overall a preferred ranking function because so many queries are short (such as between two and three terms), and limiting the degree of query masking. However, this information impacts the design of a P2P file-sharing client, and in one embodiment of this invention, there is desirably more than one ranking function in, or available for, use depending on query length. The search results are also desirably ranked according to the (original) query entered into the client computer, and not the (shortened) masked query.

Masking queries according to the method of this invention improves the accuracy of the results, i.e., the desired result is more likely to be returned in the search results. During performed experimental searches according to one embodiment of this invention, the Mean Reciprocal Rank (a known measure of accuracy) was increased by about 40%. This increase did come at an increase in the number of results, about 150%, which in turn results in an increase in computer processing time, network traffic and bandwidth usage.

The improvement in query accuracy, i.e., the ability to identify the desired result, provided by the method of this invention can outweigh any negative impact on network efficiency. However, optional techniques are available according to one embodiment of the method of this invention for improving computer processing and network efficiency while preserving much of the accuracy improvement.

In one embodiment of this invention, a method is provided for implementing a search in a network system. The method includes routing a query inputted into a client computer to a server computer and identifying a plurality of matching server files in one, and generally more, server computers. The server computer returns search results (i.e., metadata, such as the file descriptor and a hash key) corresponding to the matching server files to the client computer in response to the query. Desirably, the server computer returns to the client computer results for only a subset of the plurality of the matching server files. Each matching server file is made a member of the subset according to a given probability and/or the subset can include up to a predetermined number of the matching server files.

In one embodiment of this invention, a method for implementing a search in a peer-to-peer (P2P) file sharing system includes, as discussed above, masking at least one term in a multi-term query entered into a client computer of the P2P system to obtain a masked query, routing the masked query to server computers, and comparing the masked query to a file descriptor of server files in the server computers to identify a plurality of matching server files. One or more of the server computers that identifies more than one matching server files selects a subset of the plurality of the identified matching server files. The server computers thus do not return to the client computer results corresponding to all of the matching server files, but instead only the results corresponding to the subset of the identified matching server files. By returning only the results corresponding to this subset, fewer results corresponding to matching server files are returned, thereby lowering computer processing cost, network traffic and bandwidth usage. Once the subset information is returned to the client computer, the search results can be grouped and ranked as discussed above.

The server computer desirably contains software for determining the subset of the plurality of the results corresponding to the matching server files to be returned to the client computer. Various and alternative techniques are available for selecting the subset of the matching server files. In one embodiment of this invention the server file(s) of the subset is/are selected according to a given probability. The server computer selects each matching server file, or a search result (i.e., server file information) corresponding thereto, with probability P. In one embodiment, P is a user-tuned parameter, and represents a numerical probability that can be established according to need. By sampling the result set of the server computer in this way, an unbiased sample of the original result is obtained and the size of the search result set that arrives at the client computer is generally reduced by a factor of about P.

In another embodiment of the method of this invention, the server computer subset includes up to a predetermined number of the matching server files on that server computer. For example, the predetermined maximum number of server files in the subset could be set at three server files. If the server computer identifies only one matching server file, then a result corresponding to this one server file is returned. If, however, the server computer identifies more than three, e.g., five, matching server files, the server computer randomly selects results corresponding to three of the matching server files as the subset for returning to the client computer. In one embodiment of this invention, the server computer only returns a result corresponding to one randomly selected matching server file.

The techniques of selecting according to a probability P and up to a predetermined number can also be used in combination. In one embodiment of this invention, the server computer selects each matching server file of the subset with probability P, up to a predetermined number of matching server files.

In another embodiment of the invention, the server computer selects the server files of the subset up to a predetermined number of the matching server files those that are most frequently returned in response to client computer searches. The rationale of this approach, is that matching server files that are returned in response to queries often are generally more likely to be more desirable files, and thus more likely to be what the query is searching for. Alternatively, the server computer can also select the server files of the subset up to a predetermined number of the matching server files those that are least frequently returned in response to client computer searches.

In yet another embodiment of the invention, the server computer selects as the server files subset up to a predetermined number of the matching server files that are most similar to the masked query based upon a content based similarity metric. One such content based similarity metric includes a ranking of the server files at the server, using ranking functions such as term frequency, precision, and cosine similarity, as described above. Additionally, particular server computers can be given a bias, such as because the server is owned by the dominant source for the file, such as the originator's, author's or owner's server computer. The client computer can desirably receive a result corresponding to each of all of the matching server files from the dominant server by not identifying a subset of the matching files of the dominant server.

As discussed above, masking queries according to the method of this invention improves the accuracy of the results, such as improving the Mean Reciprocal Rank by about 40% and increasing the number of search results by about 150% as compared to searching with the original (unmasked) query. However, by implementing the method of this invention including the techniques for improving efficiency by returning only a subset of the results, such as discussed above, the Mean Reciprocal Rank was still increased by about 20% during experimental searches, but, unexpectedly, the number of results returned to the client, which is a rough measure of computer processing, bandwidth usage and network cost decreased by about 45% as compared to searching with the original (unmasked) query. Thus the invention can improve searching, while decreasing the network traffic and necessary bandwidth for the search. The techniques of this invention for improving search efficiency are not intended to be limited to P2P file sharing, and can also be incorporated and/or adapted into other information retrieval and distributed search systems protocols.

The techniques of the method of this invention for improving efficiency can be implemented according to need, such as only during higher network traffic times. In one embodiment of the method of this invention, the server computer selects and returns results corresponding to a subset of the plurality of the matching server files only upon a volume of network traffic reaching a predetermined amount. In another embodiment, the server computer selects and returns results corresponding to a subset of the plurality of the matching server files only during a predetermined time period of a day, such as a known period of generally higher network traffic time.

The method of this invention is generally automatically implemented by software. Software is generally needed on both the client computer and the server computers. The software for implementing the method of this invention can be integrated with or bundled with the protocol software for the P2P system, such as Gnutella or Kazaa P2P file sharing protocol programs. However, it is still within the scope of this invention to map this approach into hardware such as an Application Specific Integrated Circuit (ASIC) or via a Field Programmable Gate Array (FPGA).

The method of this invention can also be incorporated into the P2P file searching method according to the inventors' earlier filed U.S. patent application Ser. No. 11/298,027, herein incorporated by reference in its entirety. The masked query of this invention can be incorporated into, for example, the primary query in the method of Ser. No. 11/298,027, to increase the results obtained.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for implementing a search in a peer-to-peer (P2P) file sharing system, the method comprising:
   masking a term in a query entered into a client computer of the P2P system to obtain a masked query, wherein the term is not a stop word and masking the term in the query to obtain a masked query includes the client computer automatically removing the term from the query;
   routing the masked query from the client computer to a plurality of server computers within the P2P system;
   searching each of the plurality of server computers using the masked query by comparing each query term of the masked query to a file descriptor of at least one server file in each of the plurality of server computers; and
   returning search results to the client computer, wherein each of the search results is a matching server file from one of the plurality of server computers having a matching file descriptor including query terms of the masked query.

2. The method according to claim 1, wherein the term in the query automatically removed by the client computer is selected from a group consisting of a term that appears least frequently in at least one of the query and local descriptors, a term that appears most frequently in at least one of the query and the local descriptors, or a randomly selected term.

3. The method according to claim 1, wherein each of the search results comprises the matching file descriptor and a mathematical identifier for each of a plurality of matching server files.

4. The method according to claim 1, wherein the query comprises a conjunctive query, and the term that is masked is not a conjunction.

5. The method according to claim 1, additionally comprising displaying the search results in a human perceivable form.

6. The method according to claim 1, wherein searching the plurality of server computers comprises matching terms of the masked query to terms of a file descriptor in each of the plurality of server computers.

7. The method according to claim 6, wherein software on each of the plurality of server computers matches the terms of the masked query to terms of the file descriptor.

8. The method according to claim 6, wherein the file descriptor matches the masked query when the file descriptor contains all terms of the masked query.

9. The method according to claim 1, additionally comprising ranking the search results compared to the query entered into the client computer.

10. The method according to claim 1, wherein each of the search results comprises at least one of a file descriptor, a mathematical identifier, and a server computer identifier, and additionally comprising:
    grouping each of the search results into one of a plurality of groups as a function of the file descriptor or the mathematical identifier.

11. The method according to claim 10, additionally comprising ranking the plurality of groups according to a ranking metric.

12. The method according to claim 1, wherein the term masked by the client computer is not searched in any server computer of the P2P file sharing system.

13. A method for implementing a search in a peer-to-peer (P2P) file sharing system, the method comprising:
    receiving a query from a user into a client computer of the P2P system, the query including more than one searchable term, each of the more than one searchable term being searchable by the P2P file sharing system within a plurality of server computers of the P2P file sharing system;
    masking at least one of the more than one searchable term in the query to obtain a masked query using software executed on the client computer;
    routing the masked query from the client computer to each of the plurality of server computers within the P2P system;
    searching the each of the plurality of server computers using the masked query by comparing each query term of the masked query to a file descriptor of at least one server file in each of the plurality of server computers to identify a plurality of matching server files each having a matching file descriptor including each query term of the masked query;
    returning to the client computer as search results the file descriptor and a mathematical identifier for each of the plurality of matching server files;
    grouping each of the search results into one of a plurality of groups as a function of the mathematical identifier; and
    ranking the plurality of groups.

14. The method of claim 13, wherein the mathematical identifier comprises a hash key.

15. The method according to claim 13, wherein the masked searchable term in the query is selected from a group consisting of a term that appears least frequently in at least one of the query and local descriptors, a term that appears most frequently in at least one of the query and the local descriptors, or a randomly selected term.

16. The method according to claim 13, wherein the file descriptor matches the masked query when the file descriptor contains all terms of the masked query.

17. The method according to claim 13, wherein the client computer ranks the plurality of groups compared to the query entered into the client computer.

18. The method according to claim 17, wherein the client computer ranks the plurality of groups according to a ranking metric selected from group size, term frequency, term precision, or cosine similarity.

19. The method according to claim 13, further comprising removing any common term from the query that is not a searchable term according to the peer-to-peer (P2P) file sharing system.

20. A method for implementing a search in a peer-to-peer (P2P) file sharing system, the method comprising:

masking a term in a query entered by a user into a client computer of the P2P system to obtain a masked query, wherein the term in the query that is masked is one of a searchable term that appears least frequently in at least one of the query and local descriptors, a searchable term that appears most frequently in at least one of the query and the local descriptors, or a randomly selected searchable term;

searching a plurality of server computers of the P2P system using the masked query by comparing each query term of the masked query to a file descriptor of at least one server file in each of the plurality of server computers; and returning as search results to the client computer matching server files from the plurality of server computers having a file descriptor including all query terms of the masked query.

* * * * *